(12) United States Patent
Sun et al.

(10) Patent No.: US 9,226,062 B2
(45) Date of Patent: Dec. 29, 2015

(54) TECHNIQUES TO MITIGATE THE EFFECT OF BLOCKED SOUND AT MICROPHONE ARRAYS IN A TELEPRESENCE DEVICE

(71) Applicant: Cisco Technology, Inc., San Jose, CA (US)

(72) Inventors: Haohai Sun, Sandvika (NO); Espen Moberg, Oslo (NO); Bjørn Winsvold, Tranby (NO)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 14/218,217

(22) Filed: Mar. 18, 2014

(65) Prior Publication Data

US 2015/0271593 A1 Sep. 24, 2015

(51) Int. Cl.
*H04R 3/00* (2006.01)
*H04R 1/40* (2006.01)
*H04N 7/15* (2006.01)
*G10L 19/008* (2013.01)

(52) U.S. Cl.
CPC .............. *H04R 1/406* (2013.01); *G10L 19/008* (2013.01); *H04N 7/15* (2013.01); *H04R 3/005* (2013.01); *H04R 2201/405* (2013.01); *H04R 2420/01* (2013.01); *H04R 2430/21* (2013.01); *H04R 2499/15* (2013.01)

(58) Field of Classification Search
None
See application file for complete search history.

(56) References Cited

U.S. PATENT DOCUMENTS

| 8,320,596 | B2 | 11/2012 | Ishibashi et al. | |
|---|---|---|---|---|
| 2012/0327177 | A1 | 12/2012 | Kee et al. | |
| 2013/0044893 | A1 | 2/2013 | Mauchly et al. | |
| 2013/0271559 | A1* | 10/2013 | Feng et al. | 348/14.08 |
| 2014/0376741 | A1* | 12/2014 | Kechichian et al. | 381/92 |

* cited by examiner

*Primary Examiner* — Andrew L Sniezek
(74) *Attorney, Agent, or Firm* — Edell, Shapiro & Finnan, LLC (57) ABSTRACT

A telepresence video conference endpoint device includes spaced-apart microphone arrays each configured to transduce sound into corresponding sound signals. A processor receives the sound signals from the arrays and determines a direction-of-arrival (DOA) of sound at each array based on the set of sound signals from that array, determines if each array is blocked or unblocked based on the DOA determined for that array, selects an array among the arrays based on whether each array is determined to be blocked or unblocked, and perform subsequent sound processing based on one or more of the sound signals from the selected array.

21 Claims, 8 Drawing Sheets

TECHNIQUES TO MITIGATE THE EFFECT OF BLOCKED SOUND AT MICROPHONE ARRAYS IN A TELEPRESENCE DEVICE

TECHNICAL FIELD

The present disclosure relates to microphone arrays in a video conference endpoint device.

BACKGROUND

A telepresence video conference endpoint device includes one or more microphones to capture sound (audio) from a local user to be transmitted to another telepresence device in a shared collaboration session. Typically, the microphones are incorporated into the endpoint device in such a way as to be inconspicuous to the user. Because the user may not know where the microphones are incorporated in the device, the user may inadvertently place objects, such as a cup, a laptop computer, desktop supplies, etc., between the user and the microphones. Often, the objects block sound from the user and impair the quality of sound captured by the microphones. The impaired sound quality degrades an overall video conference user experience. Moreover, the problem is dynamic in that the placement of objects may change over time.

DESCRIPTION OF EXAMPLE EMBODIMENTS

Overview

Techniques presented herein mitigate deleterious effects cause by sound blockages at microphone arrays of a video conference endpoint (e.g., telepresence) device so as to improve sound quality. The techniques may be performed in a video conference endpoint device. The video conference endpoint device includes spaced-apart microphone arrays each configured to transduce sound into corresponding sound signals. A processor of the video conference endpoint device receives the sound signals from the arrays and determines a direction-of-arrival (DOA) of sound at each array based on the set of sound signals exclusively from that array. The processor determines if each array is blocked or unblocked based on the DOA determined for that array, selects an array among the arrays based on whether each array is determined to be blocked or unblocked, and performs subsequent sound processing based on one or more of the sound signals exclusively from the selected array.

EXAMPLE EMBODIMENTS

Figure 1:
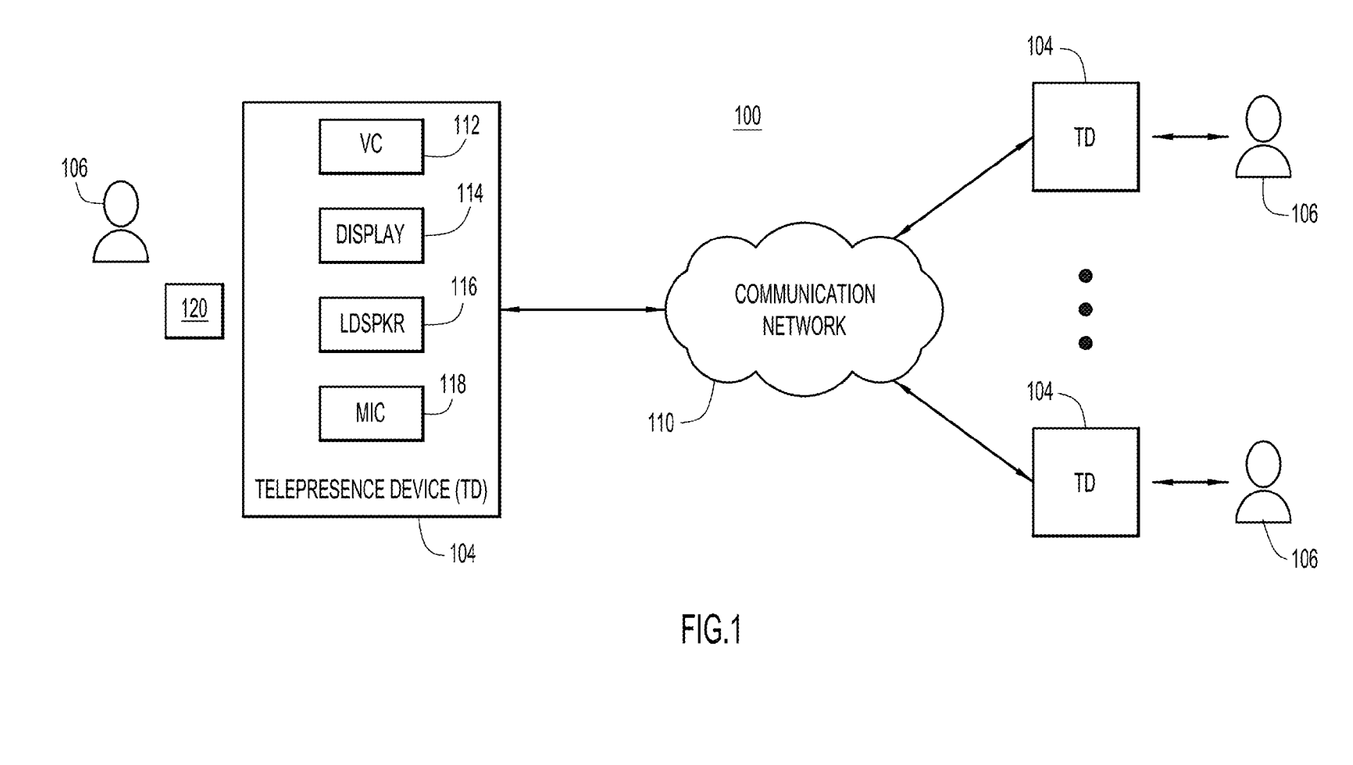
FIG. 1 is a block diagram of a telepresence video conference environment in which techniques to mitigate microphone blocking at a telepresence video conference endpoint device may be implemented according to an example embodiment.

With reference to FIG. 1, there is depicted a block diagram of a video conference (e.g., telepresence) environment 100 in which techniques to mitigate microphone blocking at a video conference endpoint device may be implemented. Video conference environment 100 includes telepresence video conference endpoint devices (TDs) 104 (also referred to herein collectively as telepresence devices 104 and individually as a telepresence device 104 or a TP device 104) operated by local users 106 and configured to establish audio-visual telepresence collaboration sessions with each other over a communication network 110. Communication network 110 may include one or more wide area networks (WANs), such as the Internet, and one or more local area networks (LANs). Each telepresence video conference endpoint device 104 may include a video camera (VC) 112, a video display 114, a loudspeaker (LDSPKR) 116, and one or more microphones (MIC) 118. Telepresence devices 104 may be wired or wireless communication devices equipped with the aforementioned components, such as, but not limited to laptop and tablet computers, smartphones, etc. In a transmit direction, telepresence devices 104 capture audio/video from their local users 106 with microphones 118/video camera 112, encode the captured audio/video into data packets, and transmit the data packets to other telepresence devices. In a receive direction, telepresence devices 104 decode audio/video from data packets received from other telepresence devices and present the audio/video to their local users 106 via loudspeaker 116/display 114.

In an ideal case, microphones 118 of telepresence device 104 each receive unobstructed sound from the local user 106 (i.e., the primary sound source) from a respective direction of arrival (DOA) aligned with the user. Often, however, one or more objects 120 between microphones 118 and user 106 block and/or deflect the sound from the user and cause each microphone to receive obstructed and/or reflected sound from a respective DOA that tends not to be aligned with the user. Thus, assuming a known/predetermined position of user 106 relative to microphones 118 (which translates geometrically to a known DOA at each microphone), the DOA of sound at each of microphones 118 indicates whether the microphone is unblocked or blocked by one or more objects 120.

Techniques presented herein advantageously use the above-described sound effects to determine and then mitigate microphone sound blocking (by objects) so as to improve sound quality. At a high level, the techniques (i) determine whether each of microphones 118 is blocked or unblocked based on a comparison between a respective DOA of sound at each of the microphones and a predetermined acceptable range of DOAs for that microphone, (ii) select a best microphone based on the determined blocked/unblocked statuses of all of the microphones, and (iii) use sound signals derived from the best (selected) microphone for subsequent sound processing.

Figure 2:
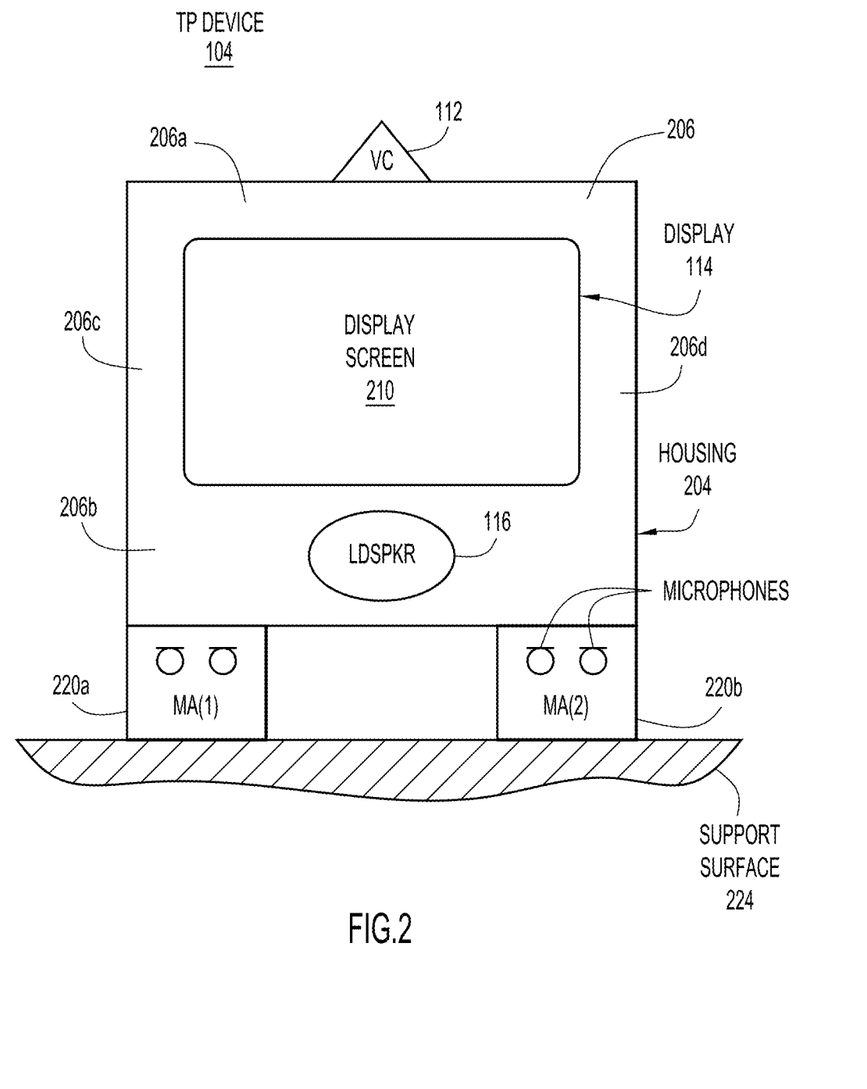
FIG. 2 is a perspective front-view of a video conference endpoint device incorporating microphone arrays in spaced legs of the device according to an example embodiment.

With reference to FIG. 2, there is depicted a perspective front-view of telepresence video conference endpoint device 104 according to an embodiment in which microphone arrays are incorporated into spaced-apart legs of the device. Telepresence device 104 includes a resilient housing 204 to house various components of the telepresence device. Housing 204 includes a front perimeter 206 having a substantially horizontal top side 206a, a substantially horizontal bottom side 206b opposite the top side, a substantially vertical left side 206c, and a substantially vertical right side 206d opposite the left side. Display 114 includes a display screen 210 that is fixed within housing 204 such that housing perimeter 206 borders display screen 210.

Telepresence device 104 also includes a left leg or foot 220a and a right leg or foot 220b spaced-apart from each other and fixed to bottom side 206b so as to be substantially aligned with and below left side 206c and right side 206d, respectively. Feet 220a, 220b may be substantially parallelepiped-shaped or may be provided in other suitable shapes. Feet 220a, 220b support telepresence device 104 on a support surface 224, such as a table or desk top surface. Telepresence device 104 includes a left microphone array MA(1) and a right microphone array MA(2) (of microphones 118 depicted in FIG. 1) housed within or affixed to foot 220a and foot 220b, respectively. In other words, feet 220a, 220b incorporate microphone arrays MA(1), MA(2), respectively.

Feet 220a, 220b (and thus microphone arrays MA(1), MA(2)) are separated from each other by a distance in a range of 20 to 40 centimeters (cm), for example; however other separation distances are possible. In one embodiment, each of microphone arrays M(1), M(2) includes two omni-directional microphones spaced from each other by a distance in a range of between 0.5 and 2 cm; however other separations are possible. Thus, the separation between microphone arrays M(1), M(2) is an order of magnitude greater than the separation between individual microphones in a given one of the microphone arrays. In other embodiments, each microphone array may include more than two omni-directional microphones.

Figure 3:
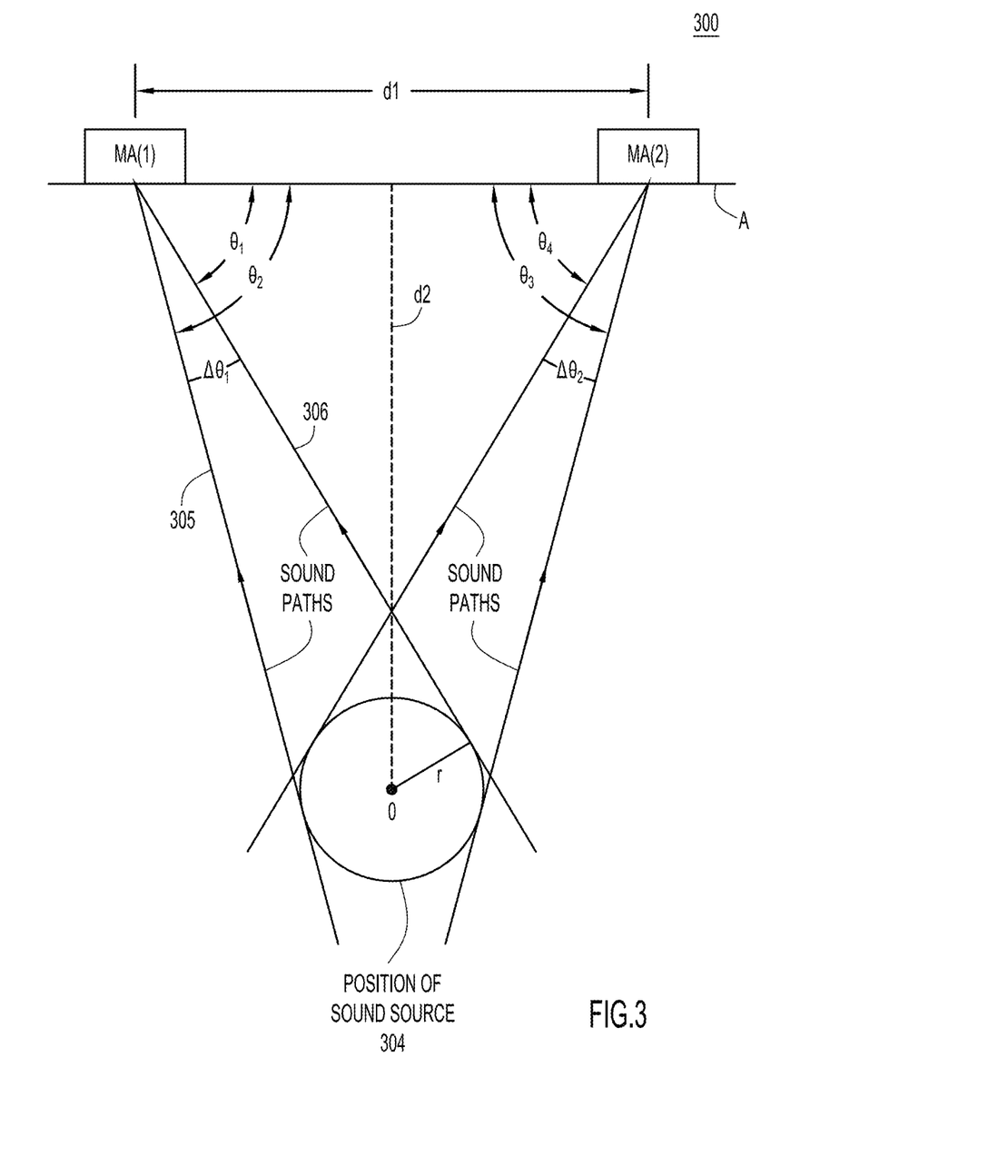
FIG. 3 is a geometrical illustration of desired/acceptable direction of arrivals (DOAs) of sound paths from an active sound source to microphone arrays in the video conference device of FIG. 2 according to an example embodiment.

With reference to FIG. 3, there is depicted a geometrical illustration 300 of desired/acceptable direction of arrivals (DOAs) of sound paths from an active sound source to microphone arrays MA(1) and MA(2). Geometrical illustration 300 represents a view looking down on the telepresence video conference endpoint device depicted in FIG. 2. As depicted in FIG. 3, microphone arrays MA(1) and MA(2) are separated from each other by a distance d1 along an axis line A, and the multiple microphones in each of microphone arrays MA(1), MA(2) are linearly arranged along the axis line. In accordance with techniques presented herein, it is desirable that microphone arrays MA(1), MA(2) receive sound from an active sound source (i.e., a speaking user 106) coinciding with a desired spatial region 304 centered at an origin O between the microphones arrays and spaced in-front of the arrays (from axis A) by a distance d2.

Sound originating from desired spatial region 304 arrives at microphone array MA(1) over a limited angular range $\Delta\theta_1$ (i.e., a range of DOAs $\Delta\theta_1$) equal to $\theta_1$-$\theta_2$ measured relative to axis A (i.e., bounded by sound paths 305 and 306 that are tangent lines to a perimeter of spatial region 304 and that converge at MA(1)). A similar angular range or range of DOAs $\Delta\theta_2$ (equal to $\theta_3$-$\theta_4$) is associated with microphone array MA(2). Angular ranges $\Delta\theta_1$ and $\Delta\theta2$ are derived geometrically from d1, d2, and a radius r of spatial region 304.

When distances d1, d2, and radius r are set to predetermined acceptable/desired values, corresponding predetermined acceptable angular ranges $\Delta\theta_1$ and $\Delta\theta_2$, i.e., a desired/acceptable range of DOAs for sound at each of microphone arrays MA(1) and MA(2), are set. As would be appreciated by one of ordinary skill in the relevant arts, angular ranges $\Delta\theta_1$ and $\Delta\theta_2$ are highly implementation specific. An example angular range $\Delta\theta_1$ may be approximately 25° based on values for $\theta_1$, $\theta_2$ of 30°, 55°, respectively, as measured from axis A. Other values of angular range are possible.

Techniques described herein assume that sound ideally originates from spatial region 304 and, therefore, (i) if sound arrives at microphone array MA(1) (or MA(2)) within the corresponding acceptable/desired range of DOAs $\Delta\theta_1$ (or $\Delta\theta_2$), the microphone is unblocked, and (ii) if sound arrives at microphone array MA(1) (or MA(2)) outside of the corresponding acceptable/desired range of DOAs $\Delta\theta_1$ (or $\Delta\theta_2$), the microphone is blocked.

Figure 4:
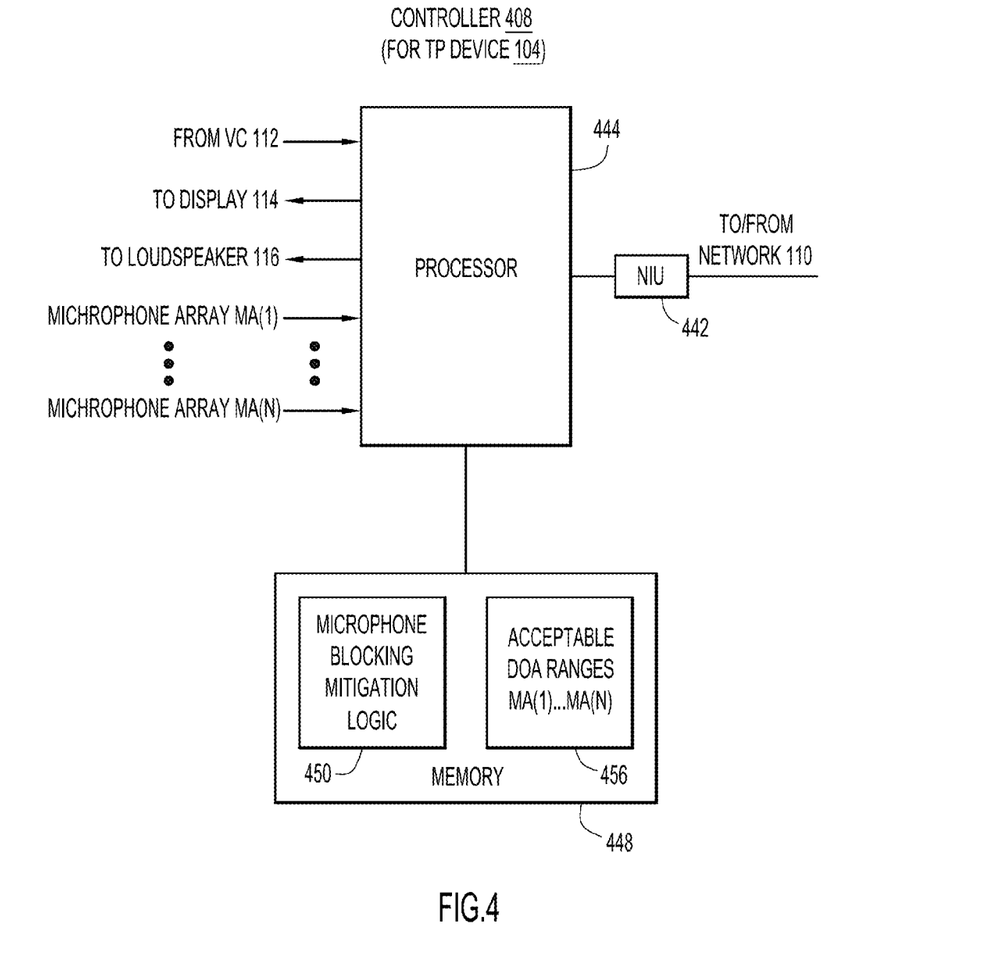
FIG. 4 is a block diagram of a controller (of a telepresence video conference endpoint device) configured to perform microphone blocking mitigation techniques according to an example embodiment.

Reference is now made to FIG. 4, which shows an example block diagram of a controller 408 of telepresence video conference endpoint device 104 configured to perform microphone blocking mitigation techniques described herein. There are numerous possible configurations for controller 408 and FIG. 4 is meant to be an example. Controller 408 includes a network interface unit 442, a processor 444, and memory 448. The network interface (I/F) unit (NIU) 442 is, for example, an Ethernet card or other interface device that allows the controller 408 to communicate over communication network 110. Network I/F unit 442 may include wired and/or wireless connection capability.

Processor 444 may include a collection of microcontrollers and/or microprocessors, for example, each configured to execute respective software instructions stored in the memory 448. The collection of microcontrollers may include, for example: a video controller to receive, send, and process video signals related to display 112 and video camera 112; an audio processor to receive, send, and process audio signals related to loudspeaker 116 and microphone arrays MA(1) . . . MA(N) (corresponding to microphones 118 in FIG. 1); and a high-level controller to provide overall control. Portions of memory 448 (and the instruction therein) may be integrated with processor 444. As used herein, the terms "audio" and "sound" are synonymous and interchangeably.

The memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 448 may comprise one or more computer readable storage media (e.g., a memory device) encoded with software comprising computer executable instructions and when the software is executed (by the processor 444) it is operable to perform the operations described herein. For example, the memory 448 stores or is encoded with instructions for Microphone Blocking Mitigation logic 450 to perform operations related to techniques to mitigate object sound blocking of microphones described herein.

In addition, memory 448 stores database 458 to store data used and generated by logic 450, including a predetermined acceptable range of DOAs associated with each of microphone arrays MA(1) . . . MA(N) that sends a respective audio signal to controller 408, as described below.

Figure 5:
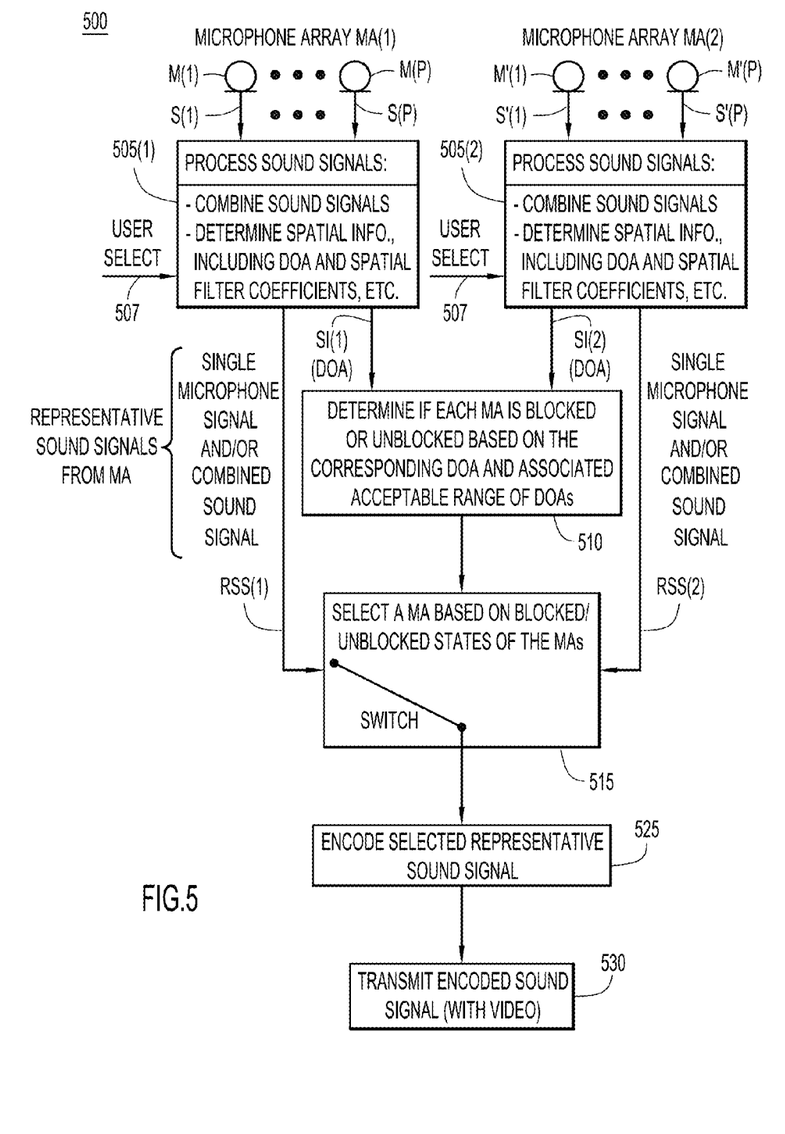
FIG. 5 is a flowchart of a method of mitigating microphone blocking based on processing of sound signals from microphone arrays in a video conference endpoint device according to an example embodiment.

With reference to FIG. 5, there is depicted a flowchart of an example method 500 of mitigating microphone blocking based on processing sound signals from microphone arrays MA(1) . . . MA(N) in telepresence device 104, where N is greater than one. In the example of FIG. 5, the number N of microphone arrays is equal to two; however, the example may be extended to include more than two microphone arrays. In the ensuing description, "microphone array(s)" are also referred to simply as "array(s)."

Each of microphone arrays MA(1), MA(2), e.g., microphone array MA(1) includes multiple microphones M(1) ... M(P). Each of microphones M(1) ... M(P) transduces sound received at that microphone (from one or more sound sources) into a corresponding one of sound signals S(1) ... S(P), and provides the sound signal to controller 408. Thus, controller 408 receives a set of sound signals, e.g., S(1) ... S(P), from each of microphone arrays MA(1), MA(2) and performs the operations described below on the received sets of sound signals.

At 505(1), Microphone Blocking Mitigation logic 450 performs spatial processing of sound signals S(1) ... S(P) exclusively from microphone array MA(1) to determine a DOA of sound from an active (emitting) sound source at that microphone array. The DOA may be determined using any known or hereafter developed method by which DOA at a microphone array may be determined based on the sound signals produced by only that microphone array. At a fundamental level, the DOA is determined based on respective levels of sound signals S(1) ... S(P) and/or respective phases of the sound signals, or a combination of both of the levels and the phases of the sound signals. Example methods to determine the DOA include, but are not limited to:

a. source localization methods (e.g., steered beamformer based, subspace based, and cross-correlation/general cross-correlation based methods) to estimate the DOA;
   b. a hybrid method that (i) derives a beamformer output (i.e., a combined beamformer sound signal) that is based on all of sound signals S(1) ... S(P), (ii) compares a level of the beamformer sound signal against a level of a sound signal from only one of the microphones representative of an omni-directional microphone, and (iii) approximately estimates the DOA based on a result of the compare;
   c. a differential method that (i) processes sound signals S(1) ... S(P) differentially (e.g., $1^{st}$ or higher order), (ii) compares a level of the differentially processed sound signals against a level of a sound signal from only one of the microphones representative of an omni-directional microphone, and (iii) approximately estimates the DOA based on a result of the compare; and
   d. a method that derives a spatial interference suppressor across sound signals S(1) ... S(P). The spatial interference suppressor includes directional filter coefficients indicative of the DOA.

As mentioned above, operation 505(1) determines the DOA of sound at microphone array M(1) and, depending on the technique used to determine the DOA, other information, such as directional/spatial filter coefficients. Together, the DOA and the other information are referred to as "spatial information." Operation 505(1) provides spatial information SI(1) for microphone array MA(1) to a next operation 510.

In addition to determining the DOA, operation 505(1) may also combine sound signals S(1) ... S(P) from microphone array MA(1) into a combined sound signal for the microphone array. The combine operation may be a simple addition or, alternatively, averaging of sound signals S(1) ... S(P) into the combined signal. In another embodiment, the combine operation may be a complex filtering operation across the sound signals S(1) ... S(P), to produce the combined sound signal. The combined sound signal may result from one of the above-mentioned methods used to determine the DOA, and may also be represented in spatial information SI(1).

As a result, operation 505(1) may output in a set of representative sound signals (indicated as "RSS(1)" in FIG. 5) for microphone array MA(1): (i) the combined sound signal; (ii) only one of sound signals S(1) ... S(P) representative of a single (omni-directional) microphone (i.e., one of microphones M(1) ... M(P)); or (iii) both the combined signal and the single sound signal. A user input/selection 507 may be provided to operation 505(1) to select which one of the combined sound signal, one sound signal, or both are provided in representative sound signals RSS(1). In a noisy environment, the combined sound signal is preferably selected; in a relatively quiet environment, preferably the one sound signal is selected. Operation 505 provides representative sound signals RSS(1) to a next operation 515.

In an embodiment, operation 505(1) frames sound signals S(1) ... S(P) into consecutive short time frames of 10 or 20 milliseconds (ms) each, and determines the spatial information and representative sound signals RSS(1) for microphone array MA(1) corresponding to each time frame. For example, operation 505(1) determines a first DOA for a first 20 ms time frame, determines a second DOA for a second 20 ms time frame immediately following the first time frame, and so on. In such an embodiment, operation 505(1) may average a predetermined number of consecutive determined DOAs and report the average DOA to next operation 510 in SI(1).

As described above, operation 505(1) performs initial processing of sound signals S(1) ... S(P) exclusively from microphone array MA(1). Concurrent/in-parallel with and independent of operation 505(1), operation 505(2) performs the same initial processing as operation 505(1), except that operation 505(2) processes sound signals exclusively from microphone array MA(2). Accordingly, the description of operation 505(1) shall suffice for operation 505(2). Operation 505(2) provides spatial information SI(2) and representative signals RSS(2) for microphone array MA(2) to operation 510 and 515, respectively. In embodiments with more than two microphone arrays, operation 505(1) is replicated for each additional array, except that the replicated operations process sound signals from their respective microphone arrays.

At 510, logic 450 determines if each microphone array MA(1), MA(2) is blocked or obstructed based on the DOA determined for that array and the predetermined acceptable range of DOAs for that array stored in database 456 (e.g., predetermined acceptable DOA ranges). Logic 450 asserts each microphone array MA(1), MA(2) is either unblocked or blocked if the DOA determined for that array is either within or not within the predetermined acceptable range of DOAs for that array. Operation 510 generates a matrix containing the blocked/unblocked states determined/asserted for microphone arrays MA(1), MA(2). In the embodiment in which operation 505(1) frames sound signals S(1) ... S(P) into consecutive short time frames, operation 510 repeats for each short time frame.

At 515, logic 450 selects a microphone array among microphone arrays MA(1), MA(2) based on whether each array is determined to be blocked or unblocked, e.g., as indicated in the matrix containing the blocked/unblocked states. Select operation 520 is indicated as a single-pole switch in FIG. 5. In the embodiment in which operation 505(1) frames sound signals S(1) ... S(P) into consecutive short time frames, operation 515 repeats for each short time frame.

At 525 and 530, logic 450 performs subsequent sound processing based on one or more of the sound signals from the selected microphone array, i.e., sound processing based on the representative sound signals RSS(1), RSS(2) corresponding to the selected one of microphone arrays MA(1), MA(2). Thus, subsequent sound processing may be based on (i) a sound signal from a single microphone from the selected microphone array, (ii) a combined sound signal from the selected microphone array, or (iii) both the single sound signal and the combined sound signal.

At operation 525, logic 450 encodes the selected one of representative sound signals RSS(1), RSS(2) into an encoded sound signal. The encoded sound signal may be combined with encoded video into a data packet.

At operation 530, logic 450 causes the encoded sound signal to be transmitted in the data packet over network 110.

Figure 6:
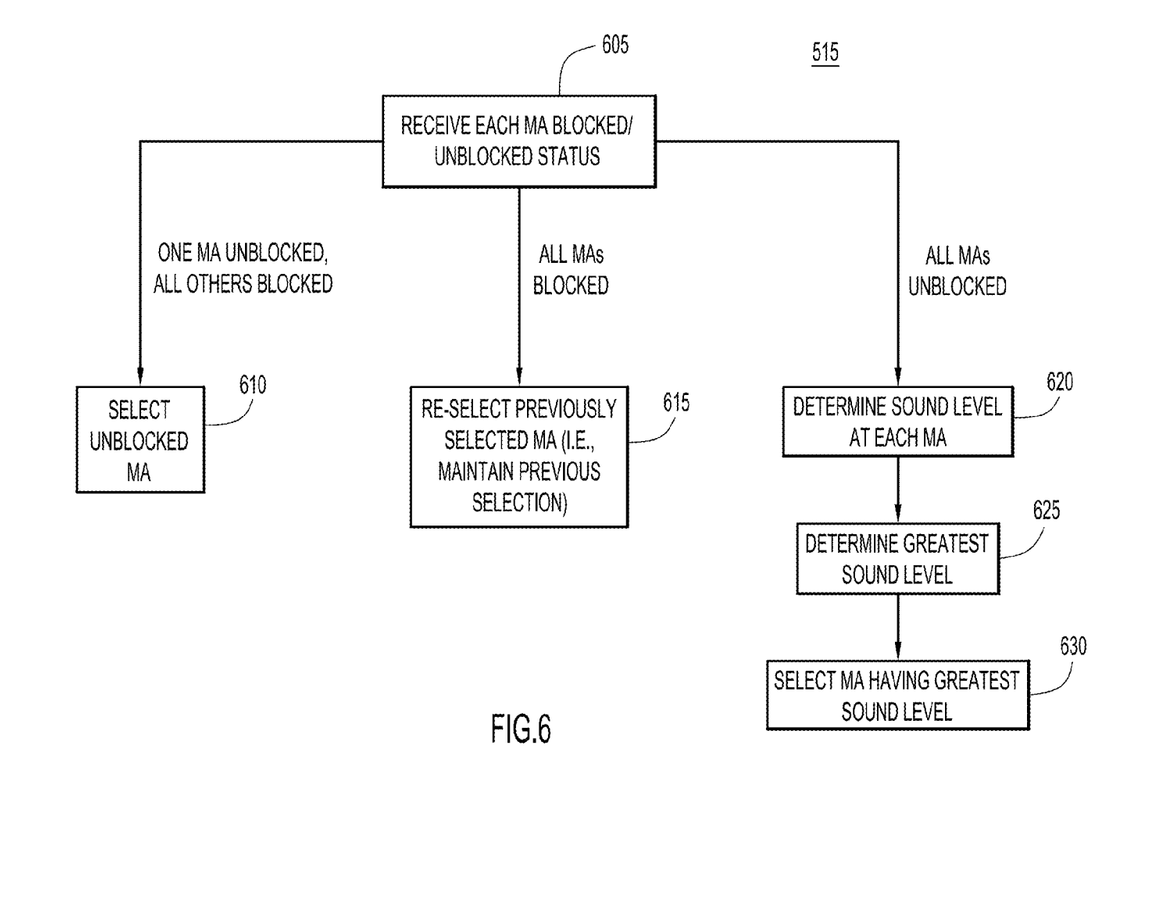
FIG. 6 is a flowchart expanding on a select operation in the method of FIG. 5, according to an example embodiment.

With reference to FIG. 6, there is depicted a flowchart expanding on the selection operation 515 from FIG. 5, according to an embodiment.

At 605, logic 450 determines whether (i) only one of microphone arrays MA(1), MA(2) is blocked, (ii) all of the arrays are blocked, or (iii) all of the arrays are unblocked.

If only one array is blocked and all others are blocked, at 610 logic 450 selects the unblocked array.

If all of the arrays are blocked, at 615 logic 450 selects the array that was previously selected based on whether each array was previously determined to be blocked or unblocked. In other words, the previous selection is maintained. This assumes that operations 505, 510, and 515 repeat over time, for example, at a frame rate of every 10 or 20 ms (see, e.g., the discussion above related to the embodiment in which operation 505 frames sound signals into consecutive short time frames).

If all of the arrays are unblocked, logic 450 performs next operations 620, 625, and 630.

At 620, logic 450 determines a sound level at each array MA(1), MA(2) based on the sound signals from that array.

At 625, logic 450 determine a greatest sound level among the determined sound levels and the corresponding array.

At 630, logic 450 selects the array having the greatest sound level.

In another embodiment, select operation 515 does not perform a hard selection of, or hard switch to, the selected one of the microphone arrays. Instead, operation 515 includes a weighted mix operation to mix together representative sound signals (e.g., RSS(1)) from one array (e.g., array MA(1)) with representative sound signals (e.g., RSS(2)) from another array (e.g., array MA(2)), where the representative sound signals RSS from the selected array may be weighted more heavily than those from the unselected array, as described below.

First, logic 450 derives a first weighted sound signal based on the corresponding representative sound signal RSS (e.g., combined sound signal or single sound signal) from the selected array.

Next, logic 450 derives a second weighted sound signal weighted less than the first weighted sound signal based on the corresponding representative sound signal RSS from one or more of the arrays that was/were not selected.

Next, logic 450 mixes the first weighted sound signal with the second weighted sound signal, to produce a mixed sound signal.

Next, subsequent sound processing operations 525 and 530 use the mixed sound signal.

Figure 7:
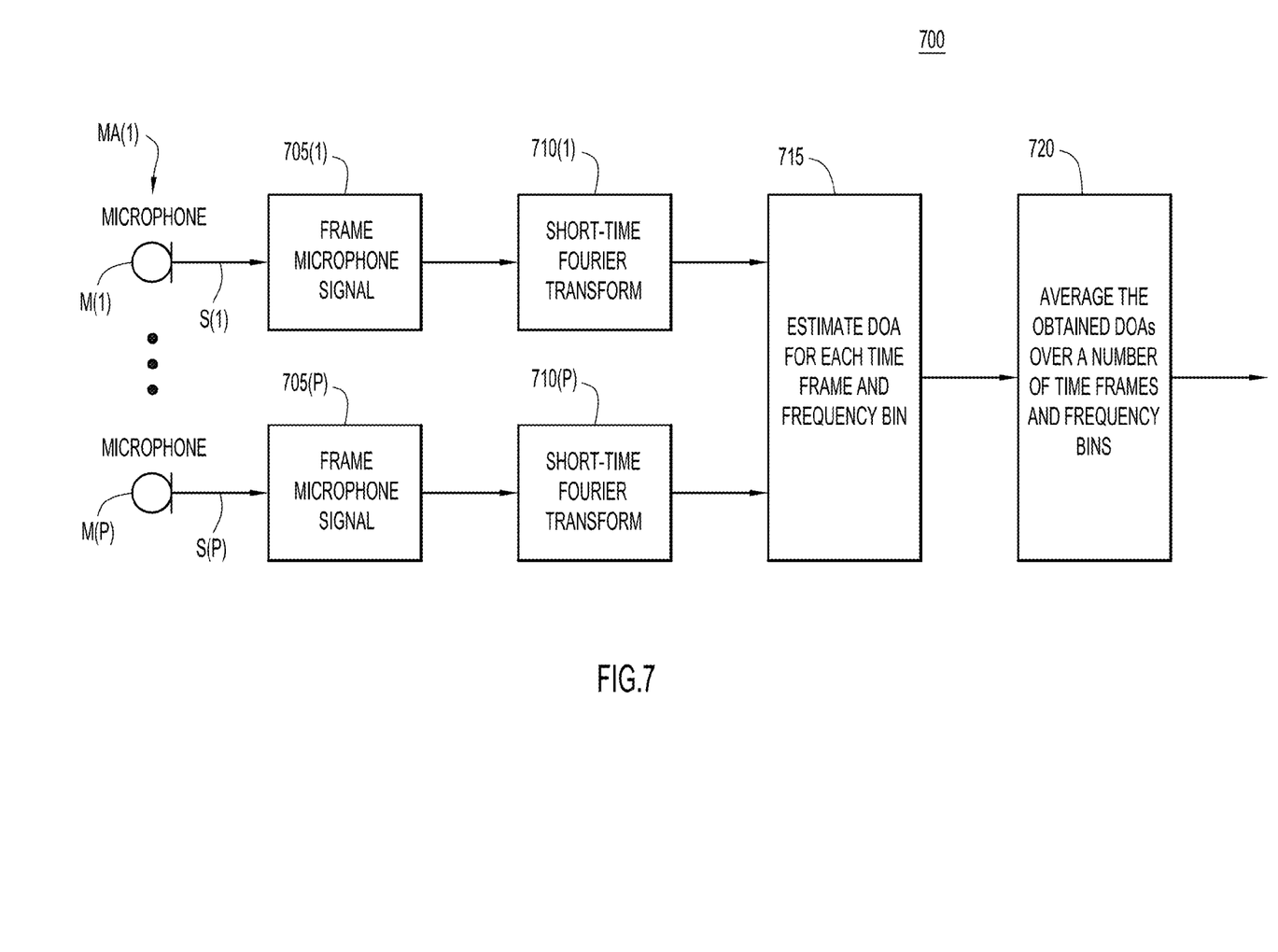
FIG. 7 is a block diagram/flowchart of a method of estimating an average direction of arrival (DOA) at a microphone array in a frequency-domain based on framed sound signals from the microphone array according to an example embodiment.

With reference to FIG. 7, there is depicted a block diagram/flowchart of an example method 700 of estimating an average DOA at microphone array MA(1) in a frequency-domain based on framed sound signals. Average DOAs estimated at all microphone arrays in telepresence video conference endpoint device 104 are provided to and used in operation 510 to determine the blocked/unblocked status of the corresponding array.

At parallel or concurrent operations 705(1)-705(P), logic 450 frames each of sound signals S(1) . . . S(P) into a short-time frame of, for example, 10 or 20 ms each. Due to the concurrency of operations, the framed sound signals coincide in time with each other.

At parallel operations 710(1)-710(P), logic 450 performs a Fast Fourier Transform (FFT) on each of the concurrently framed sound signals (i.e., for each framed sound signal).

At 715(1), logic 450 determines/estimates DOAs for coinciding frequency bins across all of the FFTs corresponding to the framed sound signals.

Operations 705(1)-705(P) and 710(1)-710(P) are repeated for a set of consecutive framed sound signals, to estimate DOAs for coinciding frequency bins for each of the framed sound signals.

At 720, logic 450 averages all of the estimated DOAs over the initial and consecutive time frames, and across the frequency bins, to produce an average DOA for the time frames. Operation 720 provides the average DOA for array MA(1) to operation 510. Similarly, average DOAs for the other arrays are also provided to operation 510. Operation 510 uses the average DOAs from the arrays (e.g., MA(1) and MA(2)) to determine the blocked/unblocked status of each array in the manner described above.

Operations 705-720 repeated over time.

Figure 8:
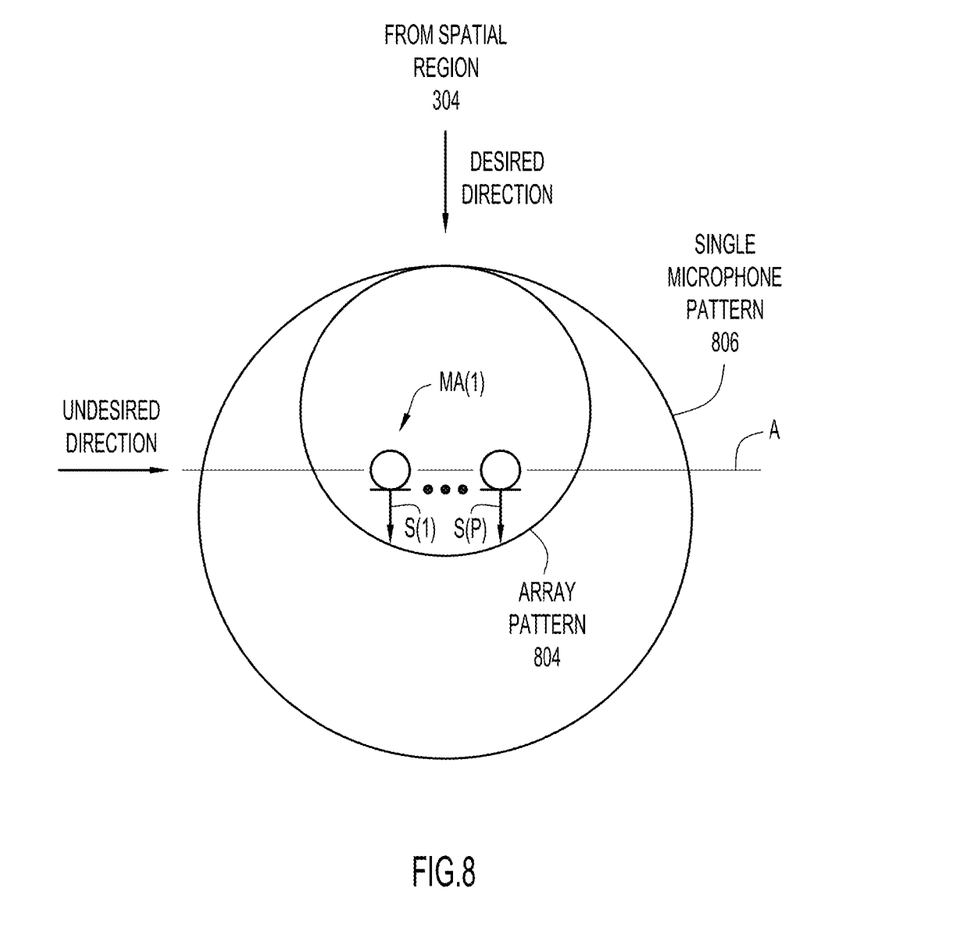
FIG. 8 is an illustration of a directivity sound pattern for a microphone array and an example polar/directivity sound pattern for one (omni-directional) microphone in the array according to an example embodiment.

With reference to FIG. 8, there is depicted an illustration of an example polar/directivity sound pattern 804 for microphone array MA(1) and an example polar/directivity sound pattern 806 for one (omni-directional) microphone in the array. According to one technique to determine a DOA of sound at array MA(1) in operation 505(1), logic 450 compares a level of a combined sound signal from array MA(1) and a level of a sound signal from the one microphone in the array. As illustrated by the polar/directivity patters of FIG. 8, if the DOA of sound is from (desired) spatial region 304, the two levels are similar. In contrast, if the DOA of the sound is from an undesired region, e.g., from the left side of FIG. 8, the combined level from array MA(1) is lower than that from the one microphone in the array. Thus, the comparison of the two levels indicates whether the DOA corresponds to sound from spatial region 304 and whether array MA(1) is blocked or unblocked.

In summary, in one form an apparatus is provided comprising: spaced-apart microphone arrays each configured to transduce sound into corresponding sound signals; and a processor configured to receive the sound signals from the arrays and configured to: determine a direction-of-arrival (DOA) of sound at each array based on the set of sound signals from that array; determine if each array is blocked or unblocked based on the DOA determined for that array; select an array among the arrays based on whether each array is determined to be blocked or unblocked; and perform subsequent sound processing based on one or more of the sound signals from the selected array.

In another form, a method is provided comprising: transducing sound received by each of spaced-apart microphone arrays into corresponding sound signals; determining a direction-of-arrival (DOA) of sound at each array based on the set of sound signals from that array; determining if each array is blocked or unblocked based on the DOA determined for that array; selecting an array among the arrays based on whether each array is determined to be blocked or unblocked; and performing subsequent sound processing based on one or more of the sound signals from the selected array.

In another form, second method is provided comprising: transducing sound received by each of spaced-apart microphone arrays into corresponding sound signals; determining a direction-of-arrival (DOA) of sound at each array based exclusively on the set of sound signals from that array; determining that each array is blocked or unblocked if the DOA determined for that array is within or not within a predetermined acceptable range of DOAs for that array; if one of the arrays is determined as unblocked while all others are determined as blocked, selecting the unblocked array; if all of the arrays are determined as blocked, selecting the array that was previously selected based on whether each array was previously determined as blocked or unblocked; and if all of the arrays are determined to be unblocked, selecting an array among the arrays that receives a greatest sound level among the arrays.

Although the method and apparatus are illustrated and described herein as embodied in one or more specific examples, it is nevertheless not intended to be limited to the details shown, since various modifications and structural changes may be made therein without departing from the scope of the method and apparatus and within the scope and range of equivalents of the claims. Accordingly, it is appropriate that the appended claims be construed broadly and in a manner consistent with the scope of the method and apparatus as set forth in the following claims.

What is claimed is:

1. An apparatus comprising:
spaced-apart microphone arrays each configured to transduce sound into corresponding sound signals; and
a processor configured to receive the sound signals from the arrays and configured to:
 determine a direction-of-arrival (DOA) of sound at each array based on the set of sound signals from that array;
 determine if each array is blocked or unblocked based on the DOA determined for that array;
 select an array among the arrays based on whether each array is determined to be blocked or unblocked; and
 perform subsequent sound processing based on one or more of the sound signals from the selected array.

2. The apparatus of claim 1, wherein the processor is further configured to assert that each array is either unblocked or blocked, respectively, if the DOA determined for that array is within or not within a predetermined acceptable range of DOAs for that array.

3. The apparatus of claim 2, wherein:
if it is determined that one of the arrays is unblocked and all others are blocked, the processor is configured to select the unblocked array; and
if it is determined that all of the arrays are blocked, the processor is configured to select the array that was previously selected based on whether each array was previously determined to be blocked or unblocked.

4. The apparatus of claim 3, wherein:
if it is determined that all of the arrays are unblocked, the processor is configured to:
 determine a sound level at each array based on a set of sound signals from that array;
 determine a greatest sound level among the determined sound levels and the corresponding array; and
 select the array having the greatest sound level.

5. The apparatus of claim 2, wherein the processor is further configured to:
combine all of the sound signals from the selected array into a combined sound signal; and
perform the subsequent sound processing on the combined sound signal.

6. The apparatus of claim 5, wherein the processor is further configured to:
derive a first weighted sound signal based on the combined sound signal from the selected array;
derive a second weighted sound signal weighted less than the first weighted sound signal based on one or more of the sound signals from one of the arrays that was not selected;
mix the first weighted sound signal with second weighted sound signal to produced a mixed sound signal; and
perform the subsequent sound processing based on the mixed sound signal.

7. The apparatus of claim 2, wherein the processor is further configured to:
perform the subsequent sound processing on one of the sound signals from one microphone in the selected array.

8. The apparatus of claim 7, wherein the processor is further configured to:
derive a first weighted sound signal based on the one sound signal from the selected array;
derive a second weighted sound signal weighted less than the first weighted sound signal based on one or more of the sound signals from one of the arrays that was not selected; and
mix the first weighted sound signal with second weighted sound signal to produce a mixed sound signal;
perform the subsequent sound processing based on the mixed sound signal.

9. The apparatus of claim 2, further comprising a network interface coupled to the processor and configured to send and receive content over a communication network, wherein the processor is further configured to:
perform an encode operation based on the one or more sound signals from the selected array, to produce an encoded audio packet; and
cause the network interface to transmit the encoded audio packet over the network.

10. The apparatus of claim 1, further comprising:
a video display configured to display video images;
a frame having the video display fixed thereto, the frame including a bottom portion having first and second spaced-apart legs configured to support the frame on a surface, the first and second spaced-apart legs having respective first and second ones of the arrays fixed thereto.

11. A method comprising:
transducing sound received by each of spaced-apart microphone arrays into corresponding sound signals;
determining a direction-of-arrival (DOA) of sound at each array based on the set of sound signals from that array;
determining if each array is blocked or unblocked based on the DOA determined for that array;
selecting an array among the arrays based on whether each array is determined to be blocked or unblocked; and
performing subsequent sound processing based on one or more of the sound signals from the selected array.

12. The method of claim 11, wherein the determining if each array is blocked or unblocked includes asserting that each array is unblocked or blocked, respectively, if the DOA determined for that array is within or not within a predetermined acceptable range of DOAs for that array.

13. The method of claim 12, wherein:
if it is determined that one of the arrays is unblocked and all others are blocked, the selecting includes selecting the unblocked array; and
if it is determined that all of the arrays are blocked, the selecting includes selecting the array that was previously selected based on whether each array was previously determined to be blocked or unblocked.

14. The method of claim 13, wherein, if it is determined that all of the arrays are unblocked, the method further comprises:
   determining a sound level at each array based on the set of sound signals from that array; and
   determining a greatest sound level among the determined sound levels and the corresponding array,
   wherein the selecting includes selecting the array having the greatest sound level.

15. The method of claim 12, further comprising combining all of the sound signals from the selected array into a combined sound signal; and
   the performing the subsequent sound processing includes performing the subsequent sound processing on the combined sound signal.

16. The method of claim 15, wherein the method further comprises:
   deriving a first weighted sound signal based on the combined sound signal from the selected array;
   deriving a second weighted sound signal weighted less than the first weighted sound signal based on one or more of the sound signals from one of the arrays that was not selected; and
   mixing the first weighted sound signal with second weighted sound signal to produce a mixed sound signal,
   wherein the performing the subsequent sound processing includes performing the subsequent sound processing based on the mixed sound signal.

17. The method of claim 12, wherein the performing the subsequent processing includes performing the subsequent sound processing on one of the sound signals from one microphone in the selected array.

18. The method of claim 17, further comprising:
   deriving a first weighted sound signal based on the one sound signal from the selected array;
   deriving a second weighted sound signal weighted less than the first weighted sound signal based on one or more of the sound signals from one of the arrays that was not selected; and
   mixing the first weighted sound signal with second weighted sound signal to produce a mixed sound signal,
   wherein the performing the subsequent processing includes performing the subsequent sound processing based on the mixed sound signal.

19. The method of claim 12, wherein the performing the subsequent processing includes:
   performing an encode operation based on the one or more sound signals from the selected array, to produce an encoded audio packet; and
   transmitting the encoded audio packet over the network.

20. A method comprising:
   transducing sound received by each of spaced-apart microphone arrays into corresponding sound signals;
   determining a direction-of-arrival (DOA) of sound at each array based exclusively on the set of sound signals from that array;
   determining that each array is blocked or unblocked if the DOA determined for that array is within or not within a predetermined acceptable range of DOAs for that array;
   if one of the arrays is determined as unblocked while all others are determined as blocked, selecting the unblocked array;
   if all of the arrays are determined as blocked, selecting the array that was previously selected based on whether each array was previously determined as blocked or unblocked; and
   if all of the arrays are determined to be unblocked, selecting an array among the arrays that receives a greatest sound level among the arrays.

21. The method of claim 20, further comprising:
   encoding sound signals derived from one or more sound signals from the selected array, to produce an encoded audio packet; and
   transmitting the encoded audio packet over a communication network.

* * * * *